United States Patent
Prema et al.

(10) Patent No.: US 7,197,382 B2
(45) Date of Patent: Mar. 27, 2007

(54) METHOD AND SYSTEM FOR DETERMINING ENGINE STATE OF A HYBRID ELECTRIC VEHICLE

(75) Inventors: Mukunda Prema, Canton, MI (US); Fazal Syed, Canton, MI (US); Ryan McGee, Ann Arbor, MI (US); Kevin Davies, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 10/709,177

(22) Filed: Apr. 19, 2004

(65) Prior Publication Data

US 2005/0230977 A1 Oct. 20, 2005

(51) Int. Cl.
*B60L 11/00* (2006.01)
*B60K 1/02* (2006.01)
(52) U.S. Cl. .............. 701/22; 716/2; 703/16
(58) Field of Classification Search ................. 701/22; 716/2, 3, 5, 7, 18; 703/16; 706/13, 16, 33, 706/45; 180/65.1, 65.3, 65.5, 65.8
See application file for complete search history.

(56) References Cited

U.S. PATENT DOCUMENTS

| | | | |
|---|---|---|---|
| 5,856,709 A * | 1/1999 | Ibaraki et al. ................ 290/45 |
| 6,077,186 A | 6/2000 | Kojima et al. | |
| 6,242,873 B1 * | 6/2001 | Drozdz et al. .............. 318/139 |
| 6,321,143 B1 | 11/2001 | Phillips et al. | |
| 6,424,157 B1 * | 7/2002 | Gollomp et al. ............ 324/430 |
| 6,434,453 B1 | 8/2002 | Kuroda et al. | |
| 6,546,320 B2 * | 4/2003 | Shimizu et al. ................ 701/22 |
| 6,885,920 B2 * | 4/2005 | Yakes et al. .................. 701/22 |
| 2004/0174125 A1 * | 9/2004 | Wilton et al. ................ 318/139 |

* cited by examiner

*Primary Examiner*—Dalena Tran
(74) *Attorney, Agent, or Firm*—David B. Kelley; Brooks & Kushman

(57) ABSTRACT

A method and system of engine state determination includes a plurality of requestors each of which compares vehicle or environmental conditions to a requirement and outputs a request state variable. The requestors are grouped according to function or component and the request state variables are combined and simplified at the output of each group. A state machine receives the final combined and simplified request state, and evaluates it according to the active or inactive status of the requests. The state machine carries out the proper state transition and outputs the desired engine state to engine control algorithms that start or stop the engine as necessary.

18 Claims, 5 Drawing Sheets

| Request | Desired Action with Engine On | Desired Action with Engine Off | Desired State Machine Transition |
|---|---|---|---|
| FPD | Turn Engine Off | Keep Engine Off | 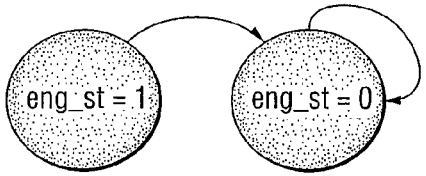 |
| FPU | Keep Engine On | Turn Engine On | 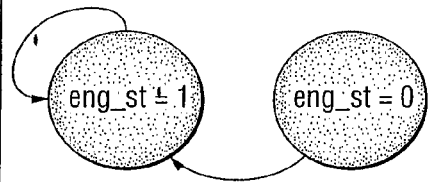 |
| IPU | Passive | Keep Engine Off | 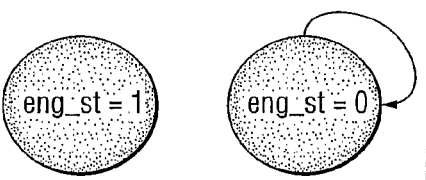 |
| PU | Keep Engine On | Turn Engine On | 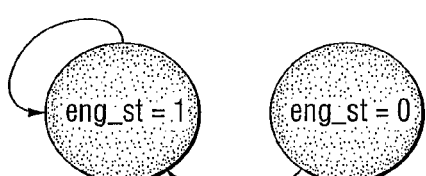 |
| IPD | Keep Engine On | Passive | 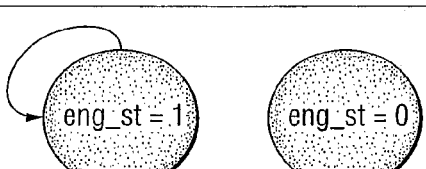 |
| PD | Turn Engine Off | Keep Engine Off | 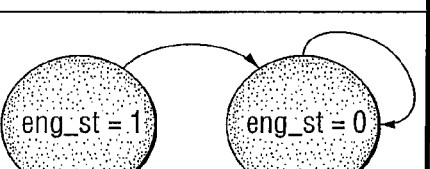 |
Fig. 3

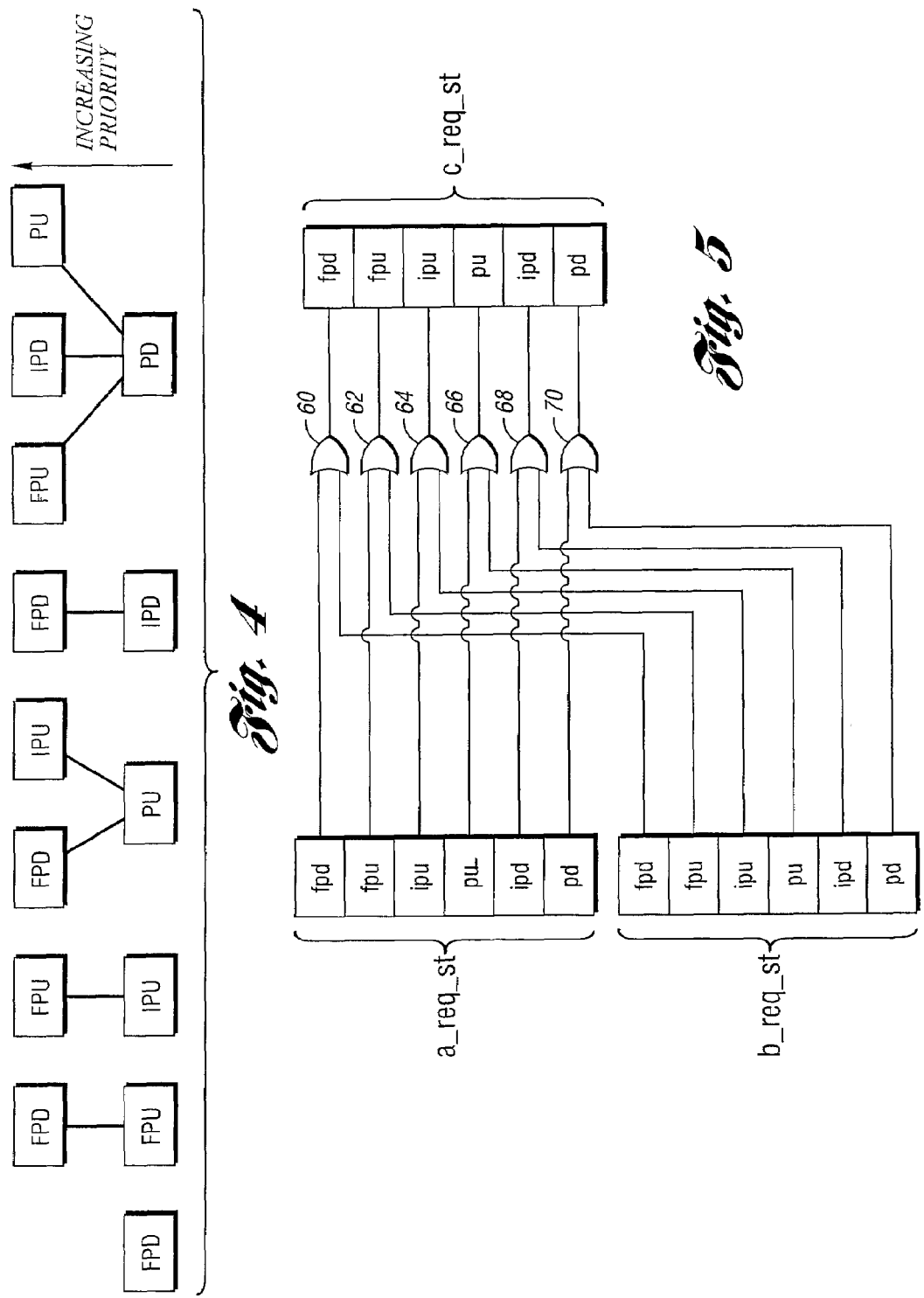

METHOD AND SYSTEM FOR DETERMINING ENGINE STATE OF A HYBRID ELECTRIC VEHICLE

BACKGROUND OF INVENTION

1. Field of the Invention

This invention relates to hybrid electric vehicles, and more particularly to a method and system for managing the various inputs that determine the on/off state of the engine in a hybrid electric vehicle.

2. Background Art

A typical powertrain for a hybrid electric vehicle has at least two sources of power. One source typically is an internal combustion engine, and the second source is a high voltage electric motor, usually an induction motor. There are three general classes of hybrid electric vehicle powertrains; i.e., parallel, series and parallel-series.

A parallel hybrid electric vehicle powertrain usually includes an internal combustion engine, one or more electric motors, and an energy storage device, usually a battery. Mechanical power from both the engine and the electric motor(s) is directly available to propel the vehicle.

A series hybrid electric powertrain includes an engine, a generator, an electric motor, and an energy storage device, usually a battery. The electric motor is the only source of mechanical power that is directly available to propel the vehicle. Power from the engine is electrically routed from the generator to the electric motor.

A parallel-series hybrid electric powertrain configuration is a combination of parallel and series configurations. It is capable of operating in a first operating mode with characteristics of a parallel hybrid electric powertrain and in a second operating mode with characteristics of a series hybrid electric powertrain.

Each of the three powertrain configurations described previously is capable of propelling the vehicle by power from the electric motor power alone, with or without the engine running to produce power. Typically there are many factors that determine whether it is desirable to run the engine or not, including those affecting safety, fuel economy, performance, and passenger comfort. An electronic vehicle controller with powertrain control software is responsible for considering these factors and making the complex decision to run the engine or not.

Because of the large number of inputs that must be evaluated by the powertrain control module as factors in determining the desired engine state, the control module software architecture must provide a means of organization and prioritization of these inputs. In addition, due to the fact that the inputs may change throughout the design phases of vehicle development, the software architecture must be flexible enough to maintain this organization in spite of modifications.

SUMMARY OF INVENTION

In accordance with the present invention a method and system of engine state determination is provided that is based on inputs from various vehicle sources. Each of a plurality of requestors compares vehicle or environmental conditions to a requirement and outputs a request state variable with a fundamental request state. The requesters are grouped according to function or component as appropriate to the implementation. The request state variables are combined and simplified at the output of each group. A state machine receives the final combined and simplified request state, and evaluates it according to the active or inactive status of the requests. The state machine carries out the proper state transition and outputs the desired engine state. Conventional engine control algorithms receive the desired engine state and start or stop the engine as necessary.

The present invention offers an organized, efficient, and effective method of managing engine state in a hybrid electric vehicle. The invention is capable of handling an unlimited number of requirements on engine state and accommodates changing requirements with minimal impact on the software architecture and organization. The invention provides clear traceability between vehicle requirements and software implementation, each requirement being handled by a single requestor that generates a specific fundamental request state. The requests may be grouped into hierarchical levels through combination and simplification operations allowing requirements such as safety, driveability, fuel economy, and other customer expectations to be associated and organized in a manner that is appropriate to the design of the vehicle. In all cases, including those where the requests conflict, the engine state is entirely predictable and stable. Requests may be prioritized so that the most important requirements such as those for safety always take precedence over less important requirements.

BRIEF DESCRIPTION OF DRAWINGS

FIG. 3 is a table of requests and desired state machine transitions as a function of engine state;

FIG. 4 is a diagram showing the request prioritization employed in the present invention;

FIG. 5 is a logic diagram showing the process of joining two or more request states together into one request;

FIG. 7 is a state diagram showing the on/off state of the engine and the logic expressions that determine engine state.

DETAILED DESCRIPTION

Figure 1:
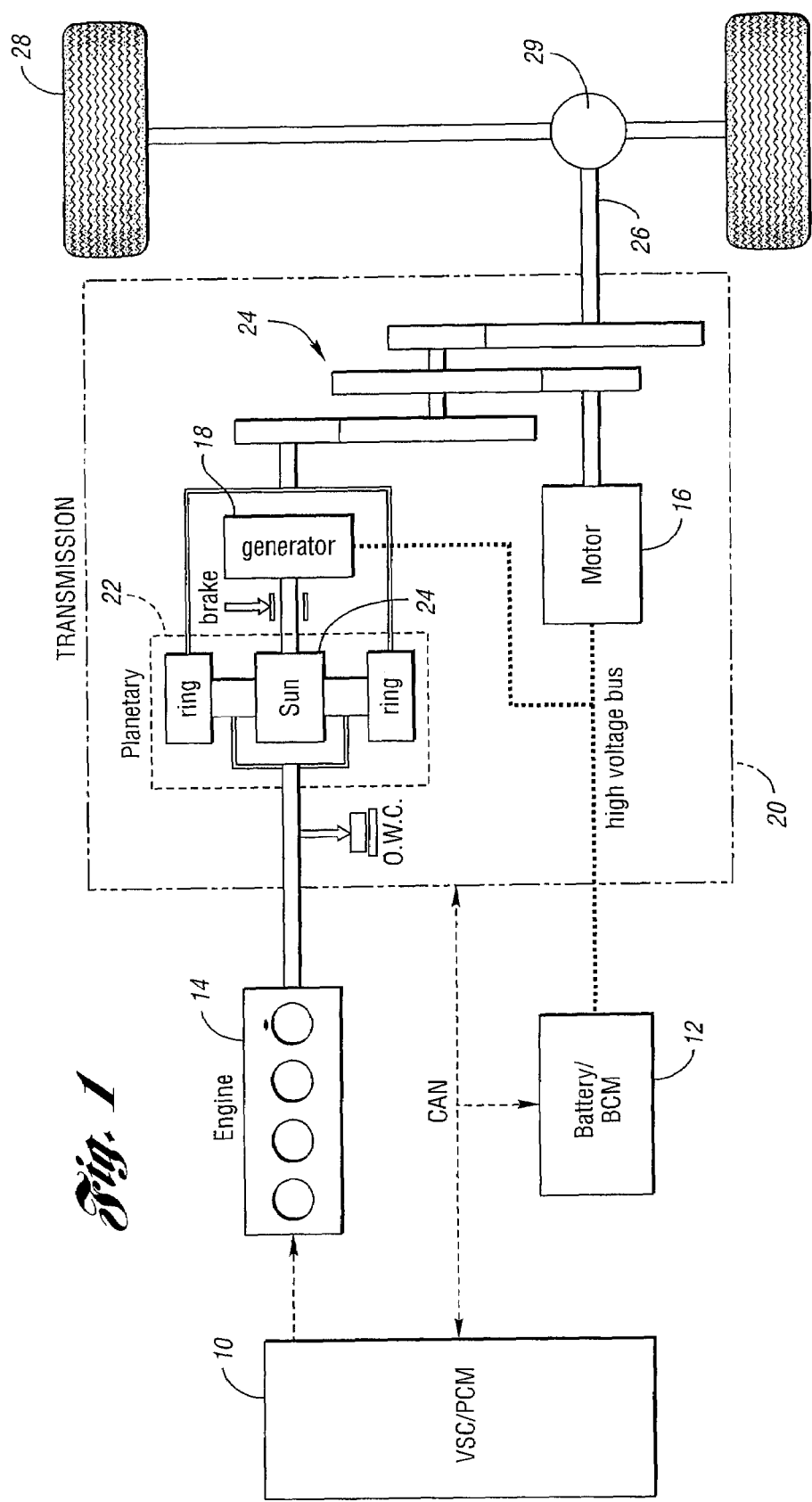
FIG. 1 is a schematic representation of a parallel-series powertrain system configuration.

Referring now to the drawings and initially to FIG. 1, a typical hybrid electric vehicle powertrain of the parallel-series configuration is shown. One example of this configuration is shown and described in U.S. patent application Ser. No. 10/248,886, filed Feb. 27, 2003, which is assigned to the assignee of the present invention and incorporated herein by reference. The invention described or claimed herein, however, is not limited to the parallel-series configuration of FIG. 1. The configuration includes a powertrain control module 10 that communicates electronically with a battery 12 and an engine 14, as well as a motor 16 and a generator 18, within a transmission 20. The transmission includes a planetary gear unit 22 that distributes torque through step ratio gears 24 to an output shaft 26 that drives vehicle traction wheels 28 through a differential and axle mechanism 29. The step ratio gears are mounted on a countershaft, with one of the gears engaging a gear that is driven by the motor 16, which acts as a torque input for the countershaft gearing.

The powertrain control module 10 is responsible for managing power flow, operating the engine 14 and other components, and maintaining the state of the vehicle including thermal conditions, faults and failures, and the state of charge of battery 12. The powertrain control module 10 includes a microprocessor and supporting electronics to run a software program. The software program includes a plurality of algorithms or modules and state machines for carrying out the aforementioned tasks.

The following terms are defined for use in describing the present invention.

engine state—a value which describes the engine condition, either on or off. Engine state is represented herein by the state variable eng_st. A value of one corresponds to engine on and zero corresponds to engine off.

request—an expressed desire for a particular action with respect to engine state. There are six requests, FPD, FPU, IPU, PU, IPD, and PD. These are depicted in FIG. 3. Each request has a particular meaning in each engine state.

request variable—a bit quantity which indicates the active or inactive status of a request. The request variables are labeled fpd, fpu, ipu, pu, ipd, and pd, corresponding to the six requests. A value of one indicates that the corresponding request is active and zero indicates that the request is inactive.

request state—a value which contains a field of six bits indicating the active or inactive status of each of the six engine requests.

fundamental request state—one of nine request states which are not redundant and do not conflict.

request state variable—a quantity which represents a request state. Request state variables are named in the form xxx_req_st.

requirement—a need for a particular fundamental request state to be generated. For example: "A request state of PULL_DOWN_REQ shall be generated if the battery state of charge is greater than 85 percent."

requestor—a software construct which compares vehicle or environmental conditions to requirements. A requestor outputs a request state variable with the appropriate fundamental request state.

combination—the process of joining two or more request states into one request state.

simplification—the process of reducing a request state into a fundamental request state.

arbitration—the process of following requests according to priority.

The fundamental request states are listed below in Table 1.

TABLE 1

Definition of fundamental request states

| Request State | fpd | fpu | ipu | pu | ipd | Pd |
|---|---|---|---|---|---|---|
| FORCE_PULL_DOWN_REQ | 1 | 0 | 0 | 0 | 0 | 0 |
| FORCE_PULL_UP_REQ | 0 | 1 | 0 | 0 | 0 | 0 |
| INHIBIT_PULL_UP_REQ | 0 | 0 | 1 | 0 | 0 | 0 |
| PULL_UP_REQ | 0 | 0 | 0 | 1 | 0 | 0 |
| INHIBIT_PULL_DOWN_REQ | 0 | 0 | 0 | 0 | 1 | 0 |
| PULL_DOWN_REQ | 0 | 0 | 0 | 0 | 0 | 1 |
| NO_REQ | 0 | 0 | 0 | 0 | 0 | 0 |
| INHIBIT_CHANGE_REQ | 0 | 0 | 1 | 0 | 1 | 0 |
| PULL_DWN_INH_PULL_UP_REQ | 0 | 0 | 1 | 0 | 0 | 1 |

Each fundamental request state comprises a 6 bit binary word that identifies a request state by setting the requests variables fpd, fpu, ipu, pu, ipd or pd to a 1 or a 0, which indicates whether a request is active or inactive. Each of the six requests, FPD, FPU, IPU, PU, IPD, and PD has a particular meaning in each engine state as depicted in FIG. 3. The requests identified by uppercase, label the types of requests, as in "do this . . . ". The request identified by lowercase, are the request variables that indicate whether a request is active or inactive. Thus, if fpu=0, then the FPU request as defined in FIG. 3 is inactive. These requests are defined with a fixed priority as shown in FIG. 4. In a case where the requests conflict, arbitration is carried out as follows:

FPD (Force Pull Down) is followed if there is an FPD request (the state of FPU, IPU, PU, IPD, and PD does not matter)

FPU (Force Pull Up) is followed if there is an FPU request and there is no FPD request (the state of IPU, PU, IPD, and PD does not matter)

IPU (Inhibit Pull Up) is followed if there is an IPU request and there is no FPU request (the state of FPD, PU, IPD, and PD does not matter)

PU (Pull Up) is followed if there is a PU request and there is no FPD request or IPU request (the state of FPU, IPD, and PD does not matter)

IPD (Inhibit Pull Down) is followed if there is an IPD request and there is no FPD request (the state of FPU, IPU, PU, and PD does not matter)

PD (Pull Down) is followed if there is a PD request and there is no FPU request, IPD request, or PU request (the state of FPD and IPU does not matter)

Figure 2:
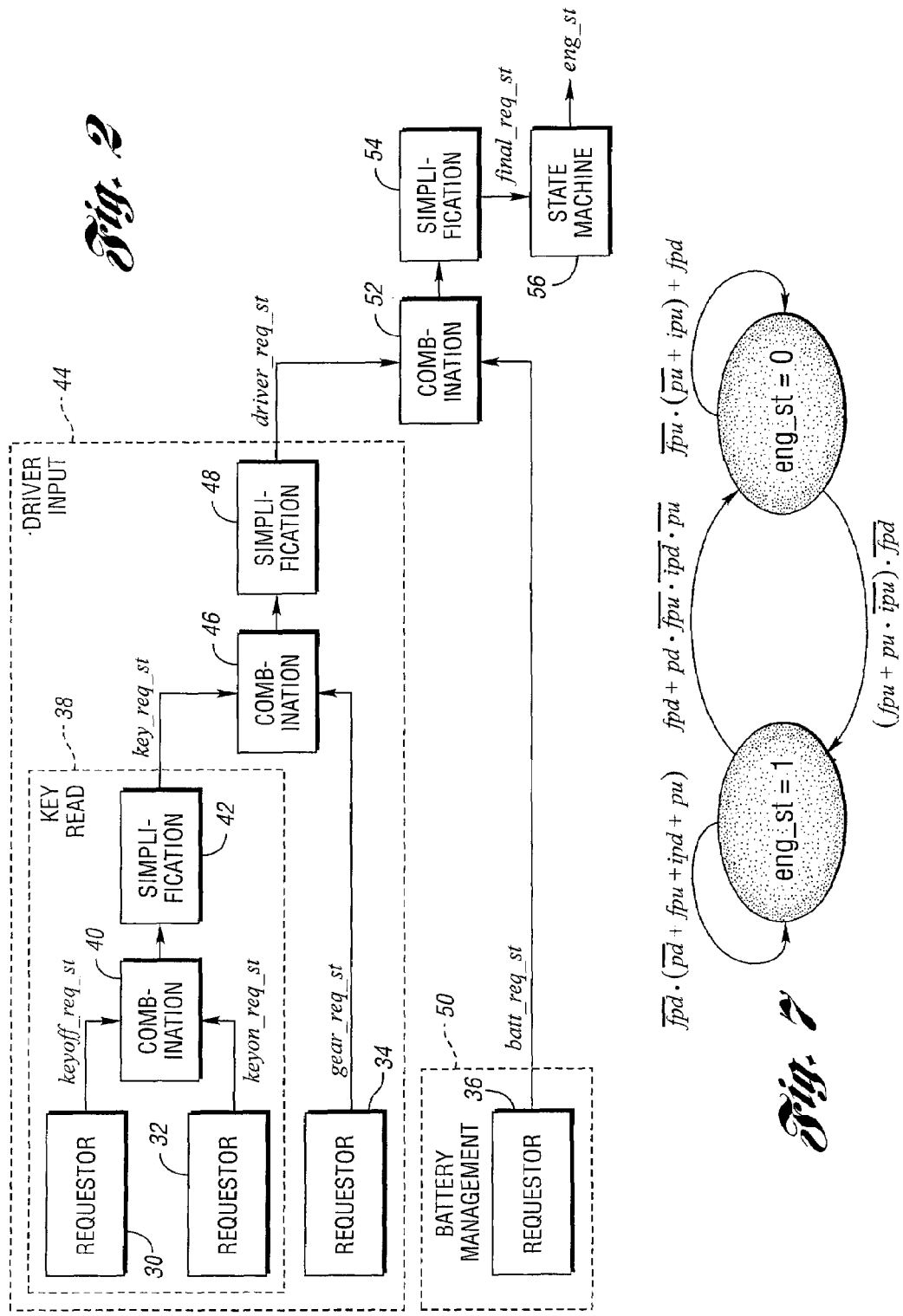
FIG. 2 is a schematic block diagram of one embodiment of the invention showing the request flow and arbitration.

Referring now to FIG. 2, one embodiment of the invention is shown to comprise a plurality of requestors or software constructs, each of which compares vehicle or environmental conditions to a requirement and outputs a request state variable with a fundamental request state. The requestors are grouped according to function or component as appropriate to the implementation. The request state variables are combined and simplified at the output of each group. The requestors and combination and simplification blocks are implemented as pieces of software code that have inputs and outputs and perform the described functions.

In the embodiment of the invention shown in FIG. 2, there are, by way of example, four requestors 30–36 each with a specific requirement. Requestor 30 generates a request state variable of keyoff_req_st, which corresponds to the fundamental request state FORCE_PULL_DOWN_REQ if the ignition key is in the OFF position, and corresponds to the fundamental request state NO_REQ if the ignition key is in the RUN or START position. Requestor 32 generates a request state variable of keyon_req_st, which corresponds to the fundamental request state of FORCE_PULL_UP_REQ for 10 seconds after the ignition key is first turned from the RUN to the START position during the current driving cycle and otherwise corresponds to the request of NO_REQ. Requestor 34 generates a request state variable of gear_req_st, which corresponds to the fundamental request state of INHIBIT_CHANGE_REQ for 2 seconds after a gear selector change is detected and otherwise corresponds to the request of NO_REQ. Requestor 36 generates a request state variable of batt_req_st, which corresponds to the fundamental request state of PULL_DOWN_REQ if the battery state of charge is greater than 85 percent and corresponds to the request of NO_REQ if the battery state of charge is less than or equal to 85 percent.

In this embodiment of the invention, there are three groups. The first group 38, identified as Key Read, includes Requestor 30 and Requestor 32. The request state variables keyoff_req_st and keyon_req_st are combined at combination block 40 and simplified at simplification block 42 to create key_req_st. The second group 44, identified as Driver Input, includes the Key Read group 38 and Requestor 34. It combines request state variables key_req_st and gear_req_st at combination block 46 and simplifies the request state variables at simplification block 48 to create driver_req_st. The third and final group joins the Driver Input group 44 and the Battery Management group 50 by combining and simplifying driver_req_st and batt_req_st in the combination block 52 and the simplification block 54. The combination function performed at blocks 40, 46, and 52 is a process of joining two or more request states into a single request state. The simplification function performed at blocks 42, 48, and 54 is a process of reducing a request state to a fundamental request state.

A state machine generally indicated at 56 receives the final combined and simplified request state, final_req_st, and evaluates it according to the active or inactive status of the six requests. The state machine carries out the proper state transition and outputs the engine state. Engine state is a value that describes the engine condition, either on or off. Engine state is represented here by the state variable eng_st. A value of one corresponds to engine on and zero corresponds to engine off. Other engine control algorithms included in the control module 10 receive the engine state, eng_st and start or stop the engine as necessary.

A request state combination operation performed in the blocks 40, 46, and 52 is achieved with a bitwise OR operation on two or more request state variables. The operation is depicted generally in FIG. 5 which shows the combination of a_req_st and b_req_st to produce c_req_st by ORing the respective single bit request states fpd, fpu, ipu, pu, ipd, and pd from a_req_st and b_req_st with OR gates 60–70 to produce c_req_st. In the combination operation, there is no loss of information with regards to requests. All active requests are carried through to the output.

There are 64 request states ($2^6$), but only nine of these states are fundamental request states. Many of these states are redundant or contain conflicting requests. For instance, a request state containing active requests for both FPD and PD is redundant because these requests express the same desire with respect to engine state (only at different priorities). Such a request state can be simplified to contain only an active request for FPD. Another example is a request state that contains active requests for both FPD and FPU, which conflict. Such a request state can be simplified to contain only an active request for FPD, which has a higher priority than FPU. The state machine 56 is capable of evaluating any of the 64 request states. Simplification, whether performed prior to the state machine as shown or within the state machine, is useful because it aids the testing and debugging steps of vehicle controls development. Simplification reduces the number of requests that programmers and engineers must learn and interpret from 64 to 9.

Figure 6:
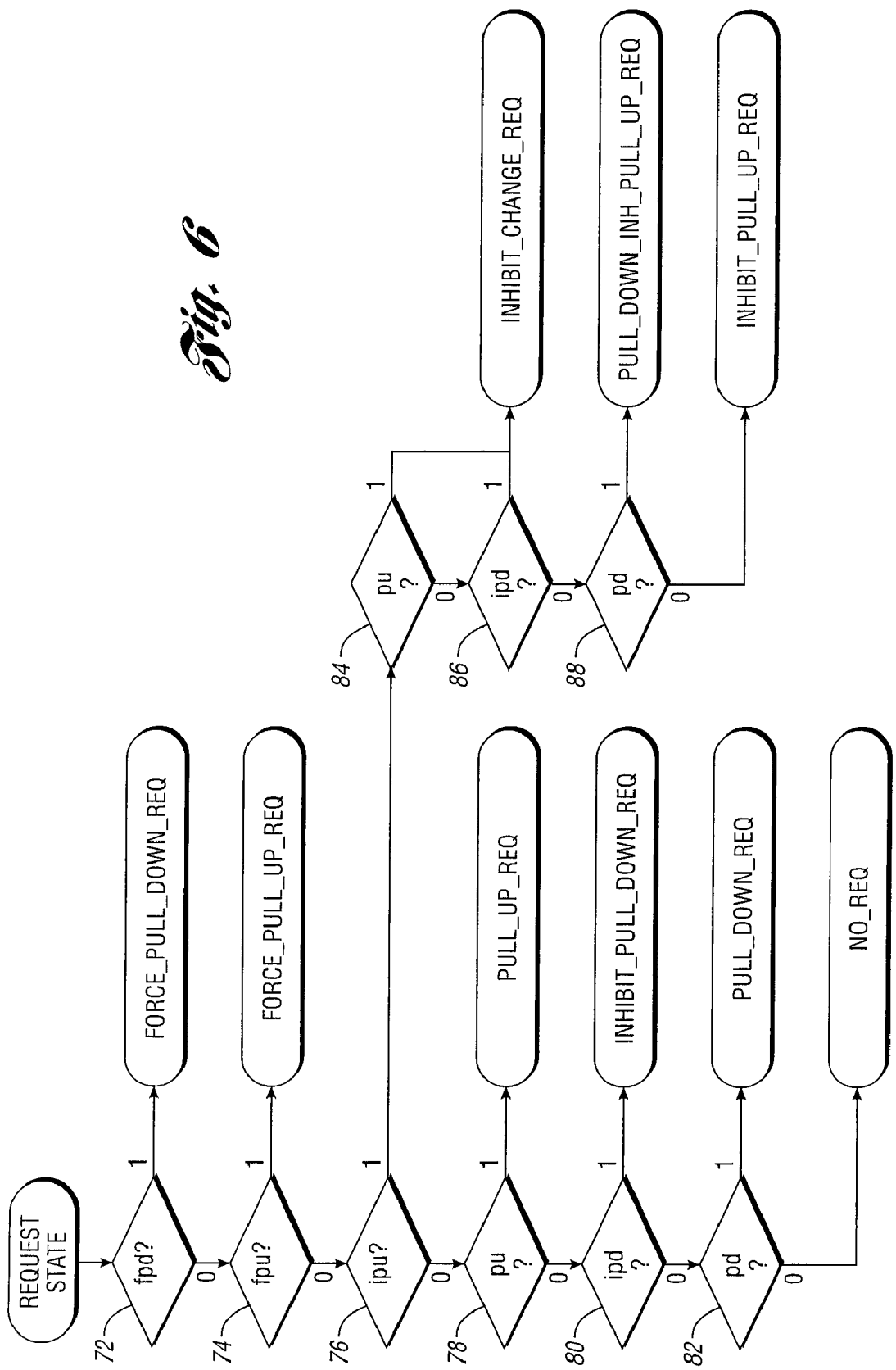
FIG. 6 is a flow chart depicting simplification of many request states into fundamental request states.

Simplification is performed according to the flow chart in FIG. 6. The process is designed such that there is no loss of information with regards to the meaning of a request state, only elimination of redundancy and conflicts. The simplifying operation selectively passes active requests according to a fixed priority and alters the inactive or active status of requests such that a minimal vocabulary of fundamental request states is sufficient to convey all request information. The process inputs a request state to a system of decision blocks 72–88. Each decision block evaluates one bit of the request state. A logic 1 value in decision blocks 72, 74, 78, 80, and 82 directly produce fundamental request states of FORCE_PULL_DOWN_REQ, FORCE_PULL_UP_REQ, PULL_UP_REQ, INHIBIT_PULL_DOWN_REQ, and PULL_DOWN_REQ, respectively, at the simplification output. A logic value of 0 in all bits results in an output of NO_REQ. A logic value of 1 in decision block 76 results in further evaluation in blocks 84–88, leading to an output of INHIBIT_CHANGE_REQ, PULL_DOWN_INH_PULL_UP_REQ, or INHIBIT_PULL_UP_REQ.

While each individual requestor will output one of the fundamental request states the result of a combination operation on two or more requestor outputs (fundamental request states) may or may not be a fundamental request state. The simplification operation ensures that the two or more requestor outputs that were combined become a fundamental request state, not just any request state. Thus, the simplification operation makes the meaning of a request state more apparent after a combination operation.

The state machine 56 is implemented according to the state diagram in FIG. 7. The state transition conditions follow from the meaning of requests specified in FIG. 3 and the prioritization of requests depicted in FIG. 4 and described previously. An engine state transition from 1 to 0 occurs if a FPD request is active or a PD request is active and the FPU, IPD, and PU requests are inactive. The active or inactive state of IPU does not matter since the IPU request is meaningless in the engine on state, as shown in FIG. 3. An engine state transition from 0 to 1 occurs only if the FPD request is inactive since FPD has higher priority than all other requests with which it conflicts. If FPD is inactive, then a transition from 0 to 1 will occur if the FPU request is active or the PU request is active and the IPU request is inactive. The active or inactive states of IPD and PD do not matter with regard to the engine state transition of 0 to 1. The IPD request is meaningless in the engine off state, as shown in FIG. 3. The PD request has a lower priority than all requests with which it conflicts, so the state of PD does not matter in the 0 to 1 transition.

With reference to FIG. 2, the following explanation of the operation of the invention is given by way of example. Assume the engine is off; the driver has just switched the key position from RUN to START for the first time and has also shifted the gear selector. The battery state of charge is 90%. Based on the requirements listed for each of the requestor 30–36 and the vehicle conditions, there are conflicting requests. The requestors will output the following request states:

Requestor 30: keyoff_req_st=NO_REQ

Requestor 32: keyon_req_st=FORCE_PULL_UP_REQ

Requestor 34: gear_req_st=INHIBIT_CHANGE_REQ

Requestor 36: batt_req_st=PULL_DOWN_REQ

The Key Read group 38 will combine and simplify the values of keyoff_req_st and keyon_req_st as follows:

| Request State Variable | Request State | fpd | fpu | ipu | pu | ipd | pd |
|---|---|---|---|---|---|---|---|
| key-off_req_st | NO_REQ | 0 | 0 | 0 | 0 | 0 | 0 |
| key_req_st block 40 output | FORCE_PULL_UP_REQ | 0 | 1 | 0 | 0 | 0 | 0 |
| key_req_st | FORCE_PULL_UP_REQ | 0 | 1 | 0 | 0 | 0 | 0 |

The Driver Input group 44 will combine and simplify the values of key_req_st and gear_req_st as follows:

| Request State Variable | Request State | fpd | fpu | ipu | pu | ipd | pd |
|---|---|---|---|---|---|---|---|
| key_req_st | FORCE_PULL_UP_REQ | 0 | 1 | 0 | 0 | 0 | 0 |
| gear_req_st | INHIBIT_CHANGE_REQ | 0 | 0 | 1 | 0 | 1 | 0 |
| block 46 output | Not a fundamental request State | 0 | 1 | 1 | 0 | 1 | 0 |
| driver_req_st | FORCE_PULL_UP_REQ | 0 | 1 | 0 | 0 | 0 | 0 |

The final stage will combine and simplify the values of driver_req_st and batt_req_st from the Battery Management group 50 as follows:

| Request State Variable | Request State | fpd | fpu | ipu | pu | ipd | pd |
|---|---|---|---|---|---|---|---|
| driver_req_st | FORCE_PULL_UP_REQ | 0 | 1 | 0 | 0 | 0 | 0 |
| batt_req_st | PULL_DOWN_REQ | 0 | 0 | 0 | 0 | 0 | 1 |
| block 52 output | Not a fundamental request state | 0 | 1 | 0 | 0 | 0 | 1 |
| final_req_st | FORCE_PULL_UP_REQ | 0 | 1 | 0 | 0 | 0 | 0 |

The state machine 56 reads the value of final_req_st and finds that fpd=0, fpu=1, ipu=0, pu=0, ipd=0, and pd=0. It makes the state transition from eng_st=0 to eng_st=1 according to the state diagram shown in FIG. 7. It will be appreciated that in FIG. 7 the notation "+" represents a logical OR operation, the "dot" represents a logical AND operation, and the "bar" represents a logical NOT operation. Thus, in order to transition from eng_st=0 to eng_st=1, it is necessary that either fpu OR pu equal 1 AND that ipu equals 0 AND further that fpd equals 0. The eng_st variable is outputted to other control algorithms that start the engine.

The invention is applicable not only to series, parallel and parallel/series hybrid electric vehicles but to any controlled device that requires an on/off decision with many inputs. This may include HVAC systems, manufacturing equipment, and robotics.

While the best mode for carrying out the invention has been described in detail, those familiar with the art to which this invention relates will recognize various alternative designs and embodiments for practicing the invention as defined by the following claims.

The invention claimed is:

1. A method for controlling on/off states of an engine in a hybrid electric vehicle powertrain, the method comprising the steps of:
   generating a plurality of request state variables based on a comparison of vehicle operating conditions and requirements, each variable indicating an active or inactive status of a plurality of engine requests;
   prioritizing the active request state variables according to a predetermined schedule;
   selecting at least two active request state variables of higher priority than other request state variables in the plurality of request state variables;
   combining the at least two request state variables to form a combined request state variable that contains active requests in the at least two request state variables;
   simplifying the combined request state variable to eliminate any redundant requests and to resolve any conflicting requests;
   providing a final request state variable;
   evaluating the final request state variable to determine whether a change in engine state is desirable;
   the step of evaluating the final request state variable comprising:
   transitioning a state machine from an engine on state to an engine off state in accordance with a first predetermined relationship of engine request variables fpu, pu, ipu and fpd and otherwise maintaining the state machine in an engine on state; and
   transitioning the state machine from an engine off state to an engine on state in accordance with a second predetermined relationship of engine request variables fpu, pu, ipu and fpd and otherwise maintaining the state machine in an engine off state, where fpd, pd, fpu, ipd, pu and ipu are engine request variables, which identify the active or inactive status of engine requests.

2. The method of claim 1 wherein the step of combining joins two or more request states through a bitwise OR operation.

3. The method of claim 2 wherein the step of simplifying includes an arbitration operation that follows the requests according to a predetermined priority.

4. The method of claim 1 wherein said engine requests are grouped in hierarchical levels through the combining and simplifying steps.

5. A method of controlling the on/off state of an engine in a hybrid electric vehicle powertrain comprising the following steps:
   generating a plurality of reguest state variables based on a comparison of vehicle operating conditions and requirements, each variable indicating the active or inactive status of each of a plurality of engine requests, the value of each request state variable being constrained to a set of fundamental request states;
   prioritizing the active request state variables according to a predetermined schedule;
   selecting at least two active request state variables of higher priority than other request state variables in the plurality of request state variables;
   combining at least two request state variables to form a combined request state variable that contains active requests in the at least two request state variables;
   simplifying the combined request state variable to eliminate any redundant requests and to resolve any conflicting requests;
   providing a final request state variable; and
   evaluating the final request state variable to determine whether a change in engine state is desirable;
   the step of evaluating the final request state variable includes the step of:
   transitioning a state machine from an engine off state to an engine on state in accordance with the following expression:

$$(fpu+pu\cdot\overline{ipu})\cdot\overline{fpd}$$

where fpu, pu, ipu and fpd are engine request variables identifying the active or inactive status of engine requests.

6. The method of claim 5 wherein each fundamental request state comprises a 6 bit binary word, each bit identifying whether an engine request state is active or inactive.

7. A method of controlling the on/off state of an engine in a hybrid electric vehicle powertrain comprising the following steps:
   generating a plurality of request state variables based on a comparison of vehicle operating conditions and requirements, each variable indicating the active or inactive status of each of a plurality of engine requests, the value of each request state variable being constrained to a set of fundamental request states;

prioritizing the active request state variables according to a predetermined schedule;

selecting at least two active request state variables of higher priority than other request state variables in the plurality of request state variables;

combining at least two request state variables to form a combined request state variable that contains active requests in the at least two request state variables;

simplifying the combined request state variable to eliminate any redundant requests and to resolve any conflicting requests;

providing a final request state variable; and evaluating the final request state variable to determine whether a chance in engine state is desirable;

the step of evaluating the final request state variable including the step of: transitioning a state machine from an engine on state to an engine off state in accordance with the following expression:

$$fpd + pd \cdot \overline{fpu} \cdot \overline{ipd} \cdot \overline{pu}$$

where fpd, pd, fpu, ipd, and pu are engine request variables identifying the active or inactive status of engine requests.

8. The method of claim 7 wherein each fundamental request state comprises a 6 bit binary word, each bit identifying whether an engine request state is active or inactive.

9. The method of claim 8 wherein the step of simplifying includes an arbitration operation that follows the requests according to a predetermined priority.

10. A method of controlling the on/off state of an engine in a hybrid electric vehicle powertrain comprising the following steps:

generating a plurality of request state variables based on a comparison of vehicle operating conditions and requirements, each variable indicating the active or inactive status of each of a plurality of engine requests, the value of each request state variable being constrained to a set of fundamental request states;

prioritizing the active request state variables according to a predetermined schedule;

selecting at least two active request state variables of higher priority than other request state variables in the plurality of request state variables;

combining at least two request state variables to form a combined request state variable that contains active requests in the at least two request state variables;

simplifying the combined request state variable to eliminate any redundant requests and to resolve any conflicting requests;

providing a final request state variable;

evaluating the final request state variable to determine whether a chance in engine state is desirable;

the step of evaluating the final request state variable including the steps of:

transitioning a state machine from an engine on state to an engine off state in accordance with the following expression:

$$fpd + pd \cdot \overline{fpu} \cdot \overline{ipd} \cdot \overline{pu}$$

and otherwise maintaining the state machine in an engine on state; and transitioning said state machine from an engine off state to an engine on state in accordance with the following expression:

$$(fpu + pu \cdot \overline{ipu}) \cdot \overline{fpd}$$

and otherwise maintaining the state machine in an engine off state, where fpd, pd, fpu, ipd, pu, and ipu are engine request variables identifying the active or inactive status of engine requests.

11. The method of claim 10 wherein the step of combining joins two or more request states through a bitwise OR operation.

12. The method of claim 11 wherein the engine requests are grouped in hierarchical levels through the combination and simplification steps.

13. A method of controlling the on/off states of an engine in a hybrid electric vehicle powertrain comprising the following steps:

generating a plurality of request state variables based on a comparison of vehicle operating conditions and requirements, each variable indicating the active or inactive status of each of a plurality of engine requests, the value of each request state variable being constrained to a set of fundamental request states;

prioritizing the active request state variables according to a predetermined schedule;

selecting at least two active request state variables of higher priority than other request state variables in the plurality of request state variables;

combining at least two request state variables to form a combined request state variable that contains active requests in the at least two request state variables;

simplifying the combined request state variable to eliminate any redundant requests and to resolve any conflicting requests;

providing a final request state variable; and evaluating the final request state variable to determine whether a change in engine state is desirable;

the step of evaluating the final request state variable including the step of:

transitioning a state machine from an engine off state to an engine on state in accordance with a predetermined relationship of engine request variables fpu, pu, ipu and fpd, which identify an active status or an inactive status of engine requests.

14. A method of controlling the on/off state of an engine in a hybrid electric vehicle powertrain comprising the following steps:

generating a plurality of request state variables based on a comparison of vehicle operating conditions and requirements, each variable indicating the active or inactive status of each of a plurality of engine requests, the value of each request state variable being constrained to a set of fundamental request states;

prioritizing the active request state variables according to a predetermined schedule;

selecting at least two active request state variables of higher priority than other request state variables in the plurality of request state variables;

combining at least two request state variables to form a combined request state variable that contains active requests in the at least two request state variables;

simplifying the combined request state variable to eliminate any redundant requests and to resolve any conflicting requests;

providing a final request state variable;

evaluating the final request state variable to determine whether a change in engine state is desirable;

the step of evaluating the final request variable including the steps of:

transitioning a state machine from an engine on state to an engine off state in accordance with a first predetermined relationship of engine request variables and otherwise maintaining the state machine in an engine on state; and transitioning the state machine from an engine off state to an engine on state in accordance with a second predetermined relationship of engine request variables and otherwise maintaining the state machine in an engine off state, the engine request variables identifying the active or inactive status of engine requests.

15. The method set forth in claim 14 wherein each fundamental request state comprises a 6 bit binary word, each bit identifying whether an engine request state is active or inactive.

16. The method set forth in claim 14 wherein the step of combining joins two or more request state variables through a bitwise OR operation.

17. The method set forth in claim 14 wherein the step of simplifying includes an arbitration operation that follows the requests according to a predetermined priority.

18. The method set forth in claim 14 wherein the engine requests are grouped in hierarchical levels through the combination and simplification steps.

* * * * *